(12) United States Patent
Thein et al.

(10) Patent No.: US 12,413,987 B2
(45) Date of Patent: Sep. 9, 2025

(54) DEVICE FOR AND METHOD OF OPERATING A RADIO NETWORK

(71) Applicant: Robert Bosch GmbH, Stuttgart (DE)

(72) Inventors: Christoph Thein, Hildesheim (DE); Ahmad Rostami, Solna (SE); Rene Guillaume, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 795 days.

(21) Appl. No.: 17/686,614

(22) Filed: Mar. 4, 2022

(65) Prior Publication Data

US 2022/0286872 A1    Sep. 8, 2022

(30) Foreign Application Priority Data

Mar. 5, 2021   (EP) ..................... 21161024

(51) Int. Cl.
*H04W 24/02*   (2009.01)
*H04W 24/08*   (2009.01)
*H04W 64/00*   (2009.01)

(52) U.S. Cl.
CPC .......... *H04W 24/02* (2013.01); *H04W 24/08* (2013.01); *H04W 64/006* (2013.01)

(58) Field of Classification Search
None
See application file for complete search history.

(56) References Cited

U.S. PATENT DOCUMENTS

2015/0289143 A1* 10/2015 McHenry ............ H04W 64/006
                                                                 455/67.13
2016/0360429 A1* 12/2016 Li ........................ H04W 88/08

(Continued)

OTHER PUBLICATIONS

Moltchanov et al., Analytical characterization of the blockage process in 3GPP New Radio systems with trilateral mobility and multi-connectivity, Computer Communications, 2019, vol. 146, pp. 110-120.

(Continued)

*Primary Examiner* — Faruk Hamza
*Assistant Examiner* — Cassandra L Decker
(74) *Attorney, Agent, or Firm* — Michael Best & Friedrich LLP (57) ABSTRACT

A device and a method of operating a radio network (100), the method comprising detecting a quality of a first radio channel that connects a first device (104) to the radio network, detecting a quality of a second radio channel that connects a second device (106) to the radio network, detecting a quality of a third radio channel that connects a third device (108, . . . , 116) to the radio network (100), detecting which of a plurality of access points (102, 118) of the radio network (100) provides access to the radio network (100) for the first device (104), the second device (106) and the third device (108, . . . , 116), detecting a cause of a degradation of the quality of at least one of the radio channels in particular an interference or a line of sight blocking depending on the first position, the second position, the third position, the quality of the first radio channel, the quality of the second radio channel and the quality of the third radio channel and depending on which access point (102, 118) of the radio network (100) provides access to the radio network (100) for the first device (104), the second device (104) and the third device (106, . . . , 116).

15 Claims, 5 Drawing Sheets

(56) References Cited

U.S. PATENT DOCUMENTS

2017/0208560 A1    7/2017  Papa et al.
2019/0098520 A1*   3/2019  Kim ..................... H04W 76/27
2021/0314791 A1*  10/2021  Hasegawa ............. H04W 24/02

OTHER PUBLICATIONS

Zhou et al., "LiFi: Line-of-Sight identification with WiFi", IEEE INFOCOM, 2014, pp. 2688-2696.
Hosseinianfar et al., "Cooperative Passive Pedestrian Detection and Localization Using a Visible Light Communication Access Network", IEEE Open Journal of the Communications Society, 2020, pp. 1325-1335.

* cited by examiner

DEVICE FOR AND METHOD OF OPERATING A RADIO NETWORK

BACKGROUND OF THE INVENTION

The invention relates to a device for and a method of operating a radio network

Radio networks comprise access points providing access to a plurality of user equipment. A sufficiently good quality of a communication channel between the access point and the user equipment is required, in order to provide reliable communications.

SUMMARY OF THE INVENTION

The device and method according to the independent claims improves the robustness of existing radio networks.

A method of operating a radio network comprises detecting a quality of a first radio channel that connects a first device to the radio network, detecting a quality of a second radio channel that connects a second device to the radio network, detecting a quality of a third radio channel that connects a third device to the radio network, detecting which access point of a plurality of access points of the radio network provides access to the radio network for the first device, the second device and the third device, detecting a cause of a degradation of the quality of at least one of the radio channels in particular an interference or a line of sight blocking depending on the quality of the first radio channel, the quality of the second radio channel and the quality of the third radio channel and depending on which access point of the radio network provides access to the radio network for the first device, the second device and the third device.

This way, a cause of a degradation of the link quality is analyzed on a fine-grained scope for local wireless networks. This allows taking better measures to solve the problem and react appropriately to re-establish a good link quality. The distinction between interference and line of sight blocking increases the reliability of the radio network when deploying it for industrial applications. In the challenging environmental conditions of industrial applications, e.g., lots of moving components and reflecting material, this concept allows to dynamically adjust the network configuration according to current conditions. This is essential for minimum downtime of the production and minimum maintenance cost.

Preferably, the method comprises detecting a first position of the first device, detecting a second position of the second device, detecting a third position of the third device, detecting the cause of the degradation of the quality of at least one of the radio channels depending on the first position, the second position, the third position. The positions are a good indicator for devices that are adjacent to each other. This improves the distinction between line of sight blocking and interference.

In one aspect, the method comprises determining a first distance between the first device and the third device and a second distance between the second device and the third device, detecting the interference when the quality of the first radio channel and the quality of the second radio channel and the quality of the third radio channel is degraded when the first radio channel connects the first device to a first access point of the radio network, and the second radio channel connects the second device to the first access point, and the third radio channel connects the third device to the first access point, and when the first distance and the second distance meet a condition.

The method may comprise determining that the condition is met, when the first distance is larger than a first threshold and the second distance is larger than the first threshold or larger than a second threshold. These thresholds are parametrizable according to the dimensions of objects and an environment that the radio network operates in.

In one aspect, the method comprises determining a first distance between the first device and the third device and a second distance between the second device and the third device, detecting the interference when the quality of the first radio channel and the quality of the second radio channel and the quality of the third radio channel is degraded when the first radio channel connects the first device to a first access point of the radio network, and the second radio channel connects the second device to the first access point, and the third radio channel connects the third device to a second access point, and when the first distance between the first device and the third device and the second distance between the second device and the third device meet a condition.

The method may comprise determining that the condition is met, when the first distance is less than a first threshold and the second distance is less than the first threshold or less than a second threshold. These thresholds are parametrizable according to the dimensions of the objects and the environment that the radio network operates in.

In one aspect, the method comprises determining a first distance between the first device and the third device and a second distance between the second device and the third device, detecting the object when the quality of the first radio channel and the quality of the second radio channel and the quality of the third radio channel is degraded when the first radio channel connects the first device to a first access point of the radio network, and the second radio channel connects the second device to the first access point, and the third radio channel connects the third device to the first access point, and when the first distance between the first device and the third device and the second distance between the second device and the third device meets a condition.

The method may comprise determining that the condition is met, when the first distance is less than a first threshold and the second distance is less than the first threshold or less than a second threshold. These thresholds are parametrizable according to the dimension of the objects and the environment that the radio network operates in.

The method may comprise providing input that comprises an indicator of the quality of the first radio channel, an indicator of the quality of the second radio channel, an indicator of the quality of the third radio channel, the first position, the second position, the third position, an indicator of an access point that connects the first device to the radio network, an indicator of an access point that connects the second device to the radio network, an indicator of an access point that connects the third device to the radio network, and providing a classification of the input as degraded due to interference or degraded due to a line of sight blocking or not degraded, and training a classificator with a training data point that maps the input to the classification of the input. The classificator can be realized based on artificial intelligence for analyzing a scene in the environment and to decide for a specific reaction. This can be for example trained based on data from other networks.

The method may comprise detecting the interference or the object depending on an output of the so trained classificator in response to input that comprises the first position, the second position, the third position, the quality of the first radio channel, the quality of the second radio channel and the quality of the third radio channel. By using learning algorithms and correlating different observations, the classificator can also predict a potential radio link degradation. This may include environmental changes like, for instance, knowing the path of a mobile device in the environment and its effect onto the radio link quality.

In one aspect, the method comprises providing input that comprises an indicator of the quality of the first radio channel, an indicator of the quality of the second radio channel, an indicator of the quality of the third radio channel, a first distance between the first position and the third position, a second distance between the second position and the third position, an indicator of an access point that connects the first device to the radio network, an indicator of an access point that connects the second device to the radio network, an indicator of an access point that connects the third device to the radio network, and providing a classification of the input as degraded due to interference or degraded due to a line of sight blocking or not degraded, and training a classificator with a training data point that maps the input to the classification of the input. Instead of using positions of devices, distances between them may be used. These may have been determined in advance.

The method may comprise detecting the interference or the object depending on an output of the so trained classificator in response to input that comprises the first distance, the second distance, the quality of the first radio channel, the quality of the second radio channel and the quality of the third radio channel. Thus, the output is provided for distances alike.

The method may comprise assigning the first device and the second device to another access point when the object is detected. This is an appropriate reaction because the object may not be present in a line of sight to the other access point.

The method may comprise assigning the first device and the second device and the third device to another channel than the first channel and than the second channel and than the third channel when the interference is detected. This is an appropriate reaction because the interference may be affecting all available access points.

The method may comprise determining the quality of the first radio link depending on a measurement of a signal strength or packet loss in a communication over the first radio link, and/or determining the quality of the second radio link depending on a measurement of a signal strength or packet loss in a communication over the second radio link, determining the quality of the third radio link depending on a measurement of a signal strength or packet loss in a communication over the third radio link.

The device for operating the radio network and a computer program are adapted to perform the steps of the method.

BRIEF DESCRIPTION OF THE DRAWINGS

Further advantageous embodiments can be derived from the following description and the drawing. In the drawing, FIG. 1 schematically depicts a first scenario,
FIG. 2 schematically depicts a second scenario,
FIG. 3 schematically depicts parts of a network controller.

DETAILED DESCRIPTION

Figure 1:
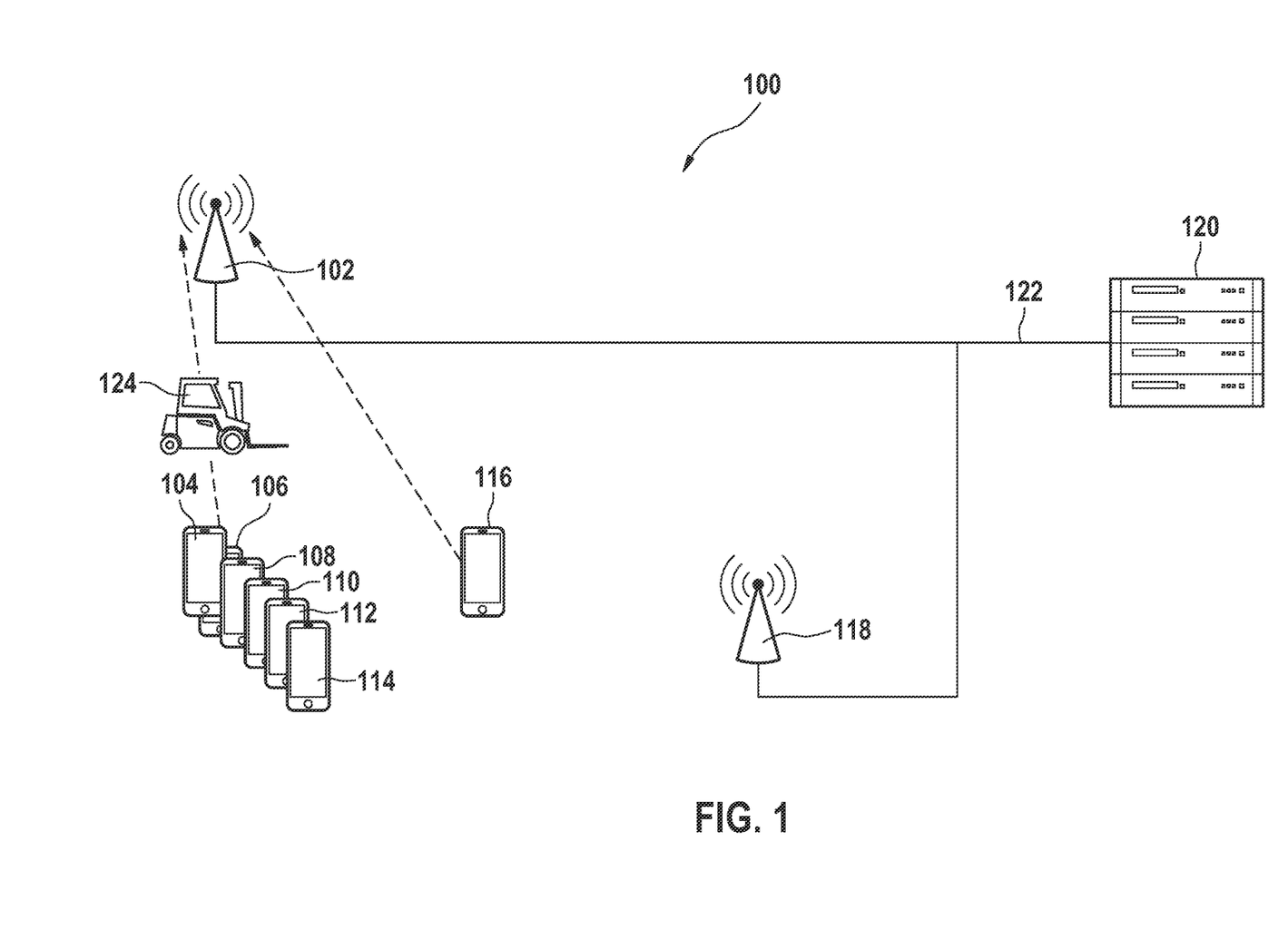

FIG. 1 schematically depicts a first scenario.

In a radio network 100 according to the first scenario, a plurality of user equipment, UE, is configured to communicate with a first access point, AP, 102. In the example a first UE 104, a second UE 106, a third UE 108, a fourth UE 110, a fifth UE 112, a sixth UE 114 and a seventh UE 116 are connected to the first AP 102. In the radio network 100 according to the first scenario 100, none of these UEs is connected to a second AP 118. The first AP 102 and the second AP 118 are connected to a network controller 120 via a data link 122. According to the first scenario 100, an object 124 blocks a line of sight, LOS, between the first AP 102 and the first UE 104, the second UE 106, the third UE 108, the fourth UE 110, the fifth UE 112 and the sixth UE 114. The LOS of the seventh UE 116 to the first AP 102 is unblocked.

Figure 2:
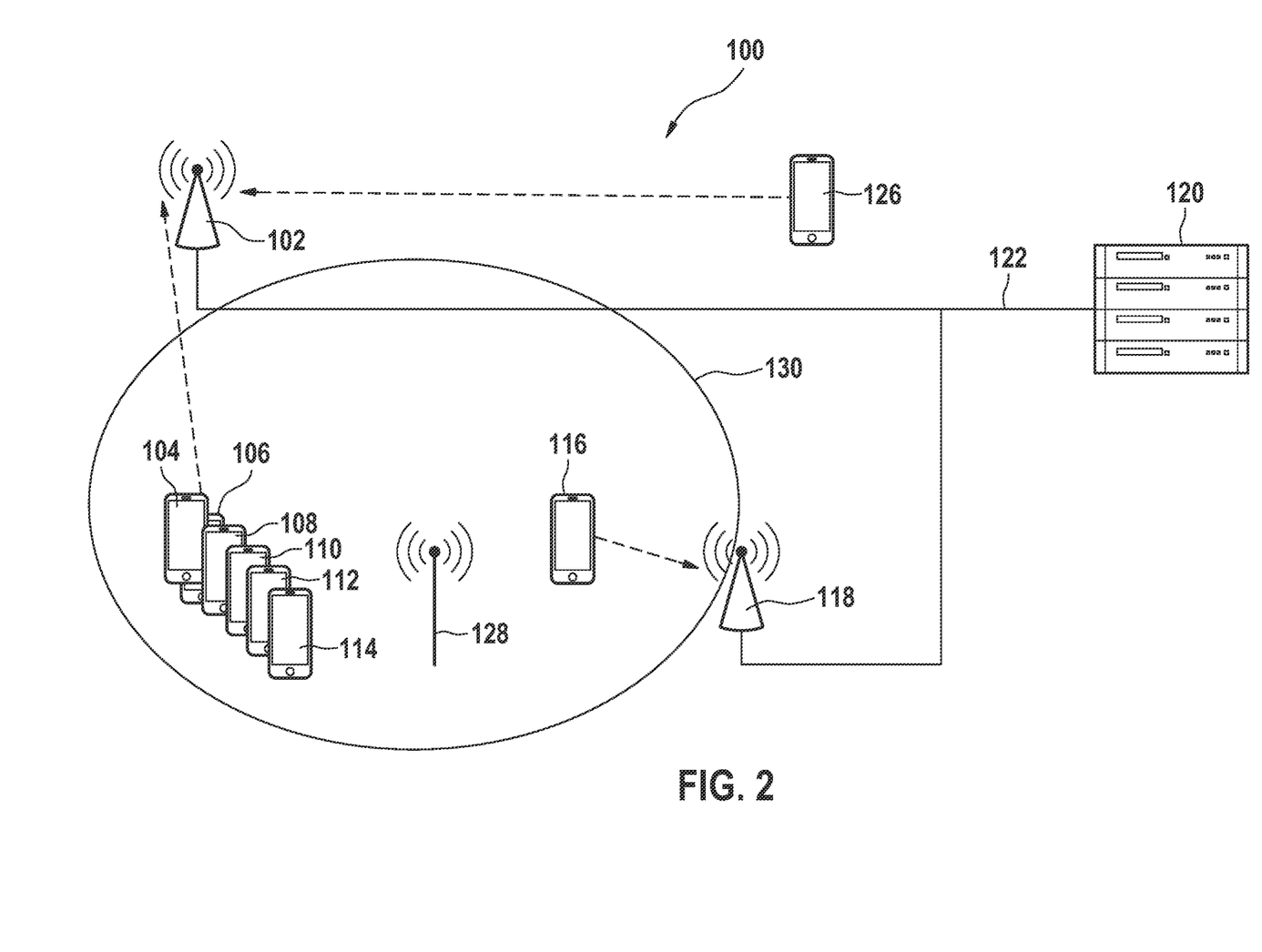

FIG. 2 schematically depicts a second scenario. In the radio network 100 according to the second scenario, the first AP 102 and the second AP 118 are connected to the network controller 120 via the data link 122.

In the radio network 100 according to the second scenario, a plurality of user equipment, UE, is configured to communicate with the first AP 102. In the example the first UE 104, the second UE 106, the third UE 108, the fourth UE 110, the fifth UE 112, and the sixth UE 114 are connected to the first AP 102. The seventh UE 116 is connected to the second AP 118. In the second scenario, an eighth UE 126 is connected to the first AP 102. According to the second scenario, a source of interference 128 creates an interference zone 130 comprising these UEs except the eighth UE 126.

In the example, the network controller 120 is configured to execute the steps of the method described below. Some of the steps may be performed at one or more of the UEs or of the APs.

The method evaluates a radio link quality of different UEs within the radio network 100 that is configured by the network controller 120. The method evaluates a cause of a degradation of the radio link quality based on knowledge of the configuration of the radio network 100 and based on information about adjacent UEs.

The method may determine a likelihood of a specific cause of the degradation in the link quality with a classificator or based on a plausibility check.

Figure 3:
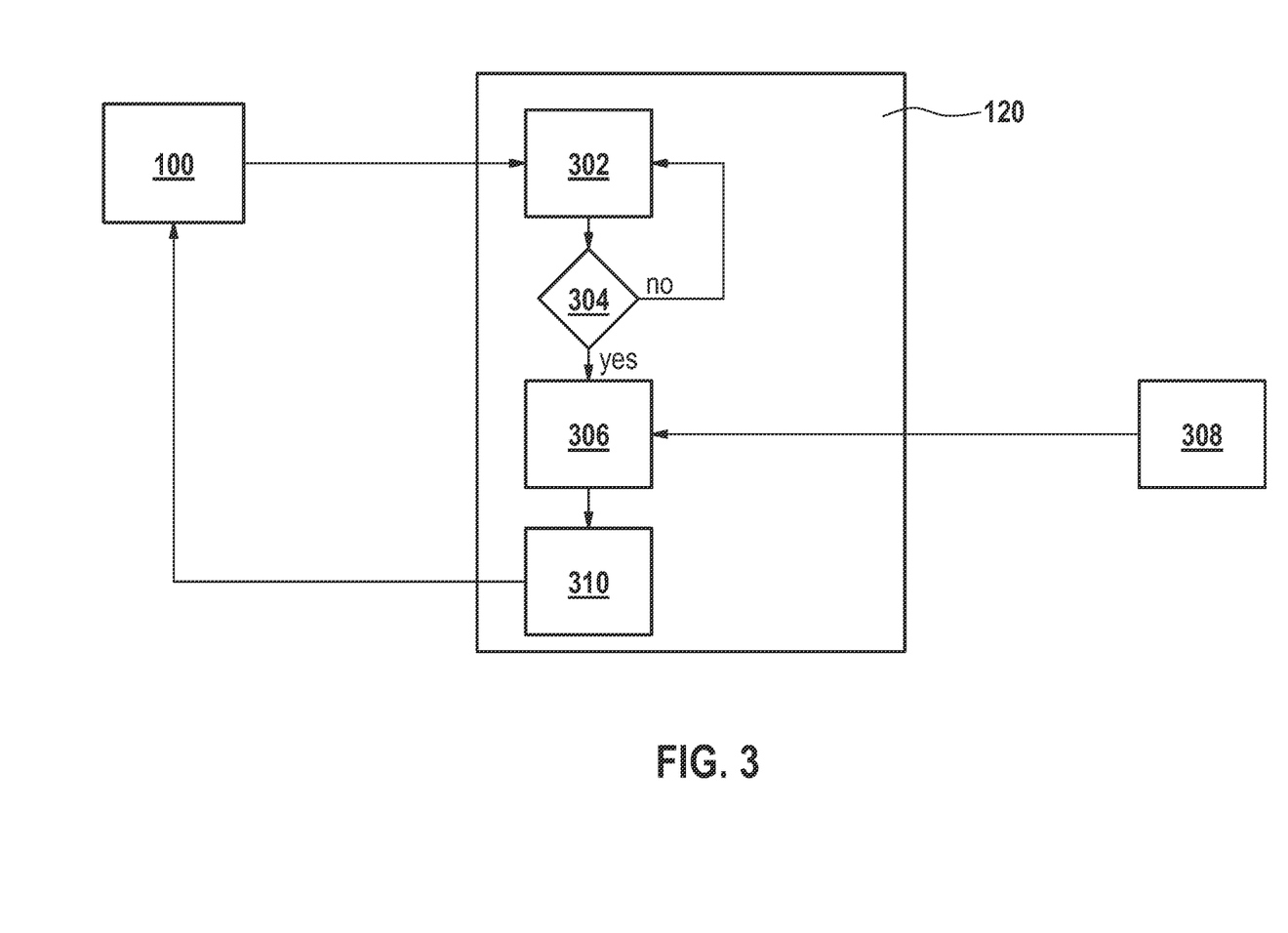

The network controller 120 is described below with reference to FIG. 3.

The network controller 120 is adapted to receive live information about a network status and positions of UEs in the radio network 100.

The network controller 120 in the example comprises a first arrangement 302 that is adapted to process the live information about the network status and positions of UEs in order to detect an error and in order to store monitoring data. The first arrangement 302 is adapted to output information indicating whether it detected an error in the network or not.

The network controller 120 in the example comprises a second arrangement 304 that is adapted to decide whether the first arrangement 302 detected an error depending on the output information. In the example, the second arrangement 304 is adapted to trigger the first arrangement 302 to store the monitoring data in case no error is detected. The monitoring data in the example is the live information about a network status and positions of UEs. The second arrangement 304 is adapted to output the live information about the network status and the positions of UEs and historic data about the network status and the positions of UEs if an error is detected. The historic data in the example is monitoring data that has been stored previously.

The network controller 120 in the example comprises a third arrangement 306. The third arrangement 306 is adapted to determine probabilities or a decision about a cause of the error that has been detected from an analysis of a situation in the radio network 100. The third arrangement 306 may be adapted to receive information about the situation. The third arrangement 306 may be adapted to receive information about radio link data during the error. This information may be provided by a network entity or a data base 308 storing information about the environment and/or context with respect to the situation and radio links in the radio network 100.

The network controller 120 in the example comprises a fourth arrangement 308. The fourth arrangement 308 is adapted to determine a reaction depending on the probabilities or the decision about the cause of the error. The fourth arrangement 308 is in the example adapted to communicate the decision about the reaction to the error to the radio network 100. The error may be a drop in a quality of a radio link in the radio network 100.

The arrangements described above may be functions implemented as a computer program or dedicated hardware processors. The network controller 120 may comprise at least one processor that is adapted to process computer readable instructions to perform the functions or steps of the methods described herein.

Figure 4:
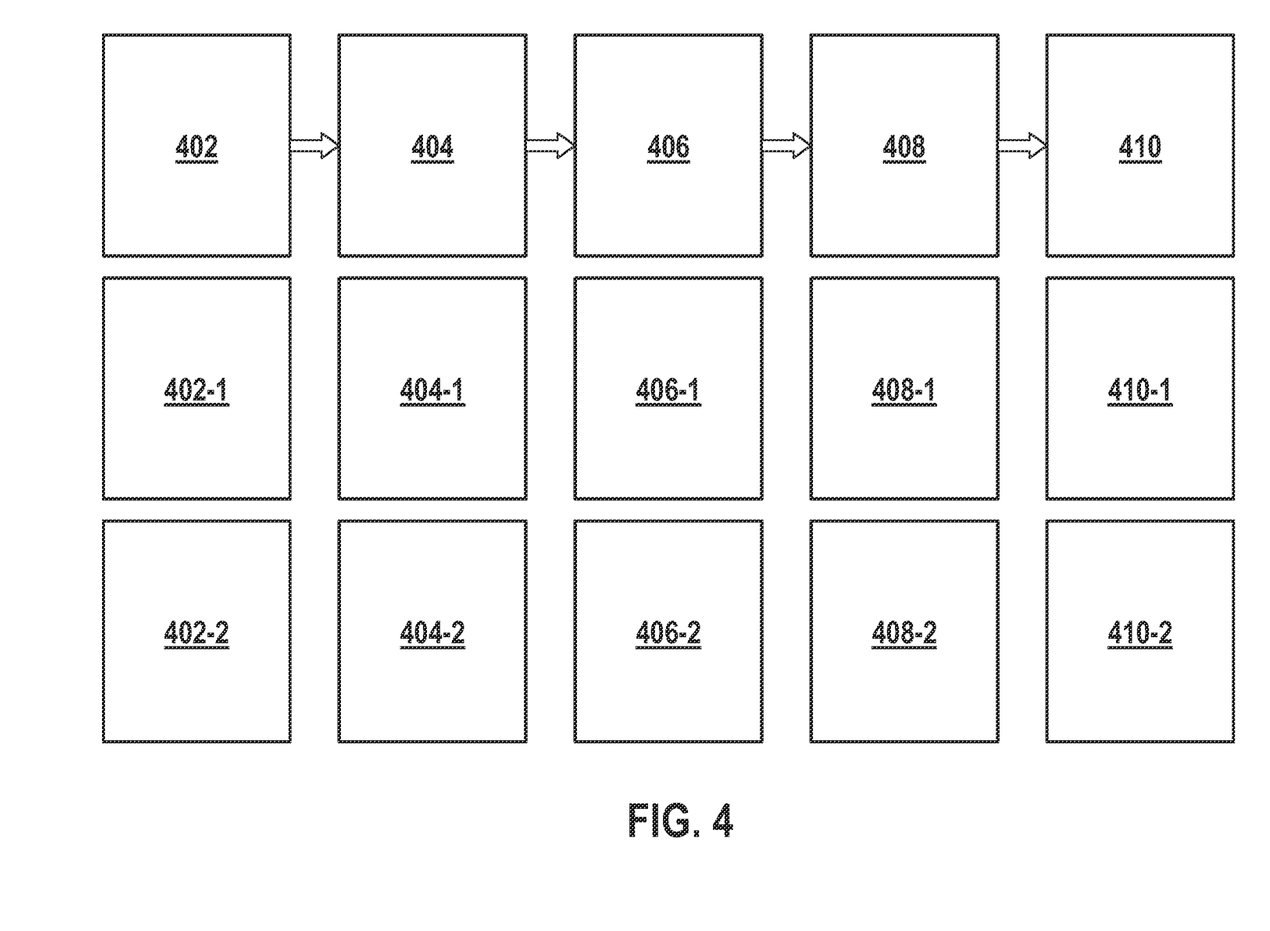
FIG. 4 depicts aspects of applications of a method of operating a radio network.

An example of operating the radio network 100 are described below with reference to a top row of FIG. 4. In a step 402, information about the UEs is collected. Afterwards in a step 404, a drop in a quality of a radio link in the radio network 100 is detected. Afterwards, in a step 406 the situation during the drop and historical data is analyzed. Afterwards in a step 408, a decision about a reaction is taken based on output from the analysis of the situation and the historical data. Afterwards in a step 410, the radio network 100 processes the reaction.

An application of the method to the first scenario is described with reference to the middle row in FIG. 4.

In a step 402-1 data per UE is collected that comprises time, position, packet loss and associated AP. Afterwards, in a step 404-1 a packet loss is monitored. Afterwards, in a step 406-1, the position of UEs that are affected by the packet loss is analyzed. A decision is taken that the link between the first UE 104, the second UE 106, the third UE 108, the fourth UE 110, the fifth UE 112, the sixth UE 114 and the first AP 102 is blocked by an obstacle, because the seventh UE 116 is not affected. Afterwards, in a step 408-1, it is decided that the first UE 104, the second UE 106, the third UE 108, the fourth UE 110, the fifth UE 112, the sixth UE 114 shall be switched to the second AP 118. Afterwards, in a step 410-1, the first UE 104, the second UE 106, the third UE 108, the fourth UE 110, the fifth UE 112, the sixth UE 114 are switched to the second AP 118. The obstacle may be an object causing a line of sight blocking.

An application of the method to the second scenario is described with reference to the bottom row in FIG. 4.

In a step 402-2 data per UE is collected that comprises time, position, packet loss and associated AP. Afterwards, in a step 404-2 a packet loss is monitored. Afterwards, in a step 406-2, the position of UEs that are affected by the packet loss is analyzed. A decision is taken that the link between the first UE 104, the second UE 106, the third UE 108, the fourth UE 110, the fifth UE 112, the sixth UE 114 and the first AP 102 is jammed by an interference, because the eighth UE 126 is not affected and the seventh UE 116 is affected even though it is associated with the second AP 118. Afterwards, in a step 408-2, it is decided that the channel of the first AP 102 and the second AP 118 has to be changed to avoid jamming. Afterwards, in a step 410-2, at least one channel of the first AP 102 and the second AP 118 is changed to avoid jamming. Jamming in this aspect may be caused by an interferer.

Figure 5:
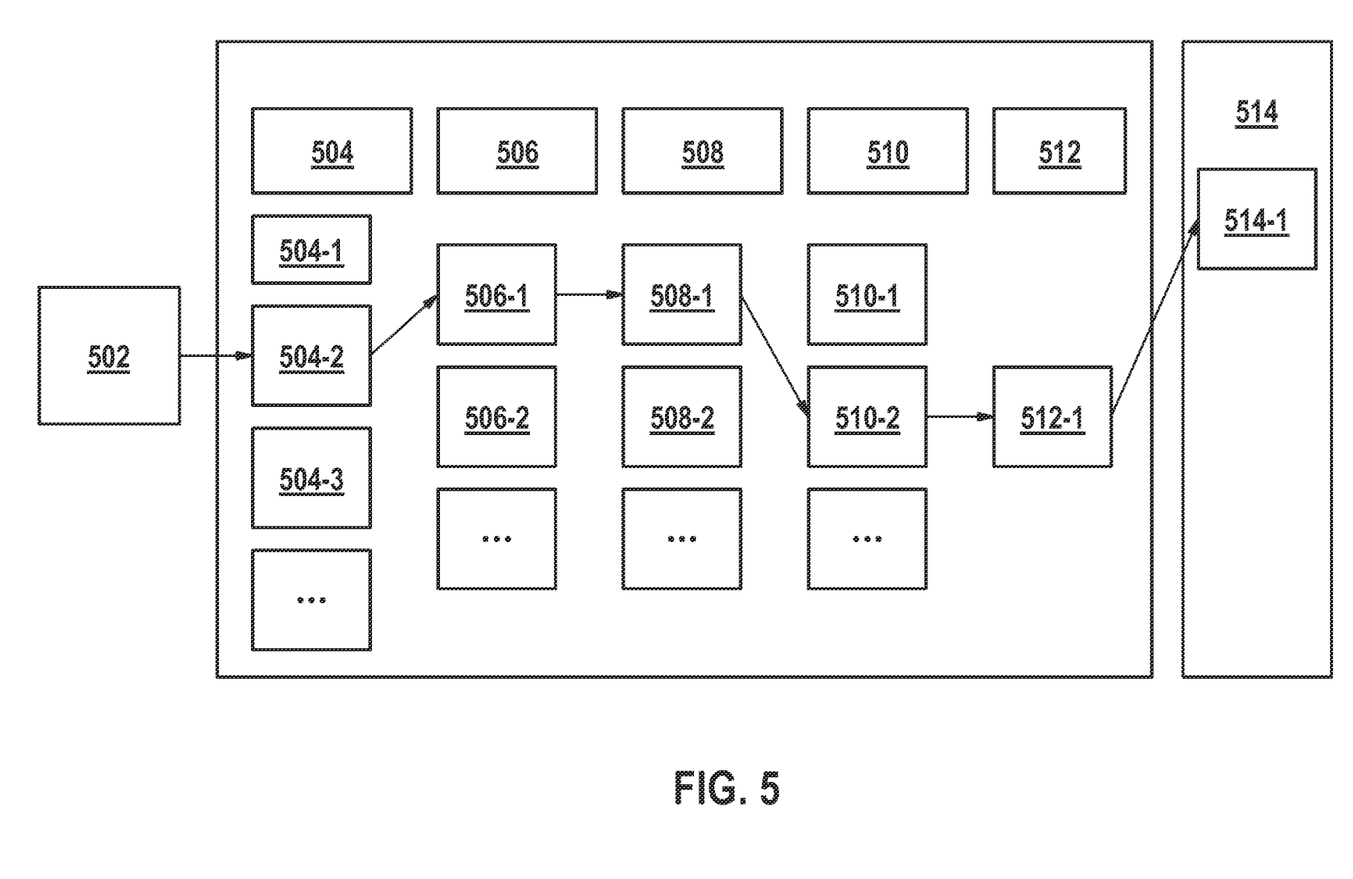
FIG. 5 depicts steps in the method.

A method of operating the radio network 100 is described below with reference to FIG. 5.

The method comprises a step 502 of providing input. The input comprises for example an indicator of a quality of a first radio channel that connects a first device to the radio network 100, an indicator of a quality of a second radio channel that connects a second device to the radio network 100, an indicator of a quality of a third radio channel that connects a third device to the radio network 100. The indicator may be a channel quality indicator, CQI. Other indicators may be a received signal strength, RSSI, a number of retransmissions or packet losses, or a latency. The first device, the second device and the third device may be one of the UEs described above.

The input may comprise a measurement of a signal strength or packet loss in a communication over the first radio link. In this case, step 502 comprises determining the quality of the first radio link depending on the measurement. The input may comprise a measurement of a signal strength or packet loss in a communication over the second radio link. In this case, step 502 comprises determining the quality of the second radio link depending on the measurement. The input may comprise a measurement of a signal strength or packet loss in a communication over the third radio link. In this case, step 502 comprises determining the quality of the third radio link depending on the measurement.

The input comprises in one aspect a first position of the first device, a second position of the second device, a third position of the third device. In another aspect, the input comprises a first distance between the first position and the third position, a second distance between the second position and the third position.

The input in the example comprises an indicator of an access point that connects the first device to the radio network 100, an indicator of an access point that connects the second device to the radio network 100, an indicator of an access point that connects the third device to the radio network 100.

Afterwards, a step 504 is executed.

In the step 504 it is determined, how many devices are affected by a degradation of the quality. In the example, it may be determined that 504-1 a single device is affected,
504-2 several adjacent devices are affected,
504-3 all devices in a given area are affected.

In one aspect, the devices that are adjacent are devices having similar radio channels to the same AP or to the interferer. Radio channel in this context may refer to a logical connection over a wireless multiplexed medium. The medium may be multiplexed by frequency-division or time-division multiplexing. The UEs and APs may use radio channels of the same frequency or of different frequencies. Radeon channels may be similar e.g., in case the frequency bands they use are adjacent.

In one aspect, the devices that are adjacent are determined from their respective positions.

In one aspect, the devices that are in the given area are determined from their respective positions.

For example, a first position of the first device is detected, a second position of the second device is detected, and a third position of the third device is detected. The positions are detected in the example from the input. When distances are used as input, the distances are detected from the input instead.

In one aspect, it is determined if a degradation of the quality of at least one channel is detected. In this aspect, a quality of the first radio channel may be detected from the input, a quality of the second radio channel may be detected from the input, and a quality of the third radio channel may be detected from the input. For example, the CQI, the signal strength or packet loss is analyzed to detect the quality.

Afterwards, a step 506 is executed.

In step 506, it is determined to which AP the devices are connected. In the example, it may be determined that 506-1 all devices are associated to the same AP, 506-2 devices are associated to different APs.

In the example, at least one AP that provides access to the radio network 100 for the first device, the second device and the third device is detected from the input. The AP that presently provides access to the device depends on the scenario.

Afterwards a step 508 is executed.

In step 508 it is determined on which radio channel the devices are transmitting. In the example, it may be determined that 508-1 the devices are transmitting on the same radio channel, 508-2 devices use different radio channels.

Afterwards, a step 510 is executed.

In the step 510, it is determined if a received power has decreased. In the example, it may be determined that 510-1 the received power has not decreased, 510-2 the received power has decreased.

Afterwards, a step 512 is executed.

In step 512 a cause of the degradation of the quality of at least one of the radio channels is detected. In the example a line of sight blocking 512-1 is detected. Other detectable causes may be an interference in the radio network 100 or an object. An absence of an error may be detected as well.

The cause may be detected depending on the quality of the first radio channel, the quality of the second radio channel and the quality of the third radio channel and on which access point of the radio network 100 provides access to the radio network 100 for the first device, the second device and the third device.

The cause may be detected additionally depending on the first position, the second position, the third position.

The decision is determined in the following examples depending on distances of the devices from each other. In this aspect, the method may comprise determining the first distance between the first device and the third device and the second distance between the second device and the third device from the positions. When the input comprises the distances, these distances are used instead.

An interference is detected in a first example, when the following conditions are met:

a) the quality of the first radio channel and the quality of the second radio channel and the quality of the third radio channel is degraded in particular at the same time, b) the first radio channel connects the first device to the first access point 102 of the radio network 100, c) the second radio channel connects the second device to the first access point 102 d) the third radio channel connects the third device to the first access point 102, e) the first distance and the second distance meet a condition.

The condition is for example met, when the first distance is larger than a first threshold and the second distance is larger than the first threshold or larger than a second threshold.

An interference is detected in a second example, when the following conditions are met:

a) the quality of the first radio channel and the quality of the second radio channel and the quality of the third radio channel is degraded, b) the first radio channel connects the first device to the first access point 102 of the radio network 100, c) the second radio channel connects the second device to the first access point 102, d) the third radio channel connects the third device to the second access point 118, e) the first distance between the first device and the third device and the second distance between the second device and the third device meet a condition.

The condition is for example met, when the first distance is less than a first threshold and the second distance is less than the first threshold or less than a second threshold.

A line of sight blocking is detected in a third example, when the following conditions are met:

a) the quality of the first radio channel and the quality of the second radio channel and the quality of the third radio channel is degraded, b) the first radio channel connects the first device to the first access point 102 of the radio network 100, c) the second radio channel connects the second device to the first access point 102, d) the third radio channel connects the third device to the first access point 102, e) the first distance between the first device and the third device and the second distance between the second device and the third device meets a condition.

The condition is for example met, when the first distance is less than a first threshold and the second distance is less than the first threshold or less than a second threshold.

In one aspect the method comprises providing a classification of the input as degraded due to interference or degraded due to a line of sight blocking in the line of sight or not degraded. The classification may be provided as the probabilities in particular as output of a deep convolutional neural network that has been trained to classify the input accordingly.

In this aspect, the method may comprise training the classificator with a training data point that maps the input to the classification of the input and detecting the interference or the object depending on an output of the so trained classificator in response to input that is received in while operating the radio network 100.

The training data points that are used for training and the input that is received while operating the network 100 are matched. This means that for example the first position, the second position, the third position, the quality of the first radio channel, the quality of the second radio channel and the quality of the third radio channel are input for training and for classification purpose. This means that for example the first distance, the second distance, the quality of the first radio channel, the quality of the second radio channel and the quality of the third radio channel are input for training and for classification purpose.

Afterwards a step 514 is executed.

In the step 514, a reaction 514-1 is determined depending on whether an interference or a line of sight blocking or an absence of an error is detected. In the example the reaction is a change of a channel in case an interference is detected.

In the example the reaction is a change of the AP in case a line of sight blocking is detected. In the example the reaction is no change in case the absence of an error, e.g., no quality degradation, is detected.

For example, the first device and the second device are assigned to another access point when the line of sight blocking or the object is detected For example, the first device and the second device and the third device are assigned to another channel than the first channel and than the second channel and than the third channel when the interference is detected.

The reaction is then implemented in the radio network 100.

These steps may be repeated while the radio network 100 operates.

The invention claimed is:

1. A method of operating a radio network, the method comprising:
    detecting a quality of a first radio channel that connects a first device to the radio network,
    detecting a quality of a second radio channel that connects a second device to the radio network,
    detecting a quality of a third radio channel that connects a third device to the radio network,
    detecting which access point, between a first access point and a second access point, provides access to the radio network for the first device, the second device and the third device,
    detecting a first position of the first device, detecting a second position of the second device, detecting a third position of the third device,
    determining a first distance between the first device and the third device and a second distance between the second device and the third device,
    determining that a first condition is met when the first distance is larger than a first threshold and the second distance is larger than the first threshold or larger than a second threshold, and
    detecting a cause of a degradation of the quality of at least one of the radio channels based at least in part on the quality of the first radio channel, the quality of the second radio channel, and the quality of the third radio channel and depending on which respective access point of the radio network provides access to the radio network for the first device, the second device and the third device,
    wherein the cause is determined to be interference when the first condition is met and when the first access point connects the first, second, and third devices to the radio network via the first, second, and third radio channels respectively.

2. The method according to claim 1, wherein the cause is determined to be interference further based on degradation of the quality of the first radio channel and the quality of the second radio channel and the quality of the third radio channel.

3. The method according to claim 1, wherein the cause is determined to be interference when a second condition is met and when the first access point connects the first and second devices to the radio network via the first and second radio channels respectively and the second access point connects the third device to the radio network via the third radio channel.

4. The method according to claim 3, further comprising determining that the second condition is met when the first distance is less than a first threshold and the second distance is less than the first threshold or less than a second threshold.

5. The method according to claim 1, wherein the cause is determined to be an object blocking line of sight when a third condition is met, when the first access point connects the first, second, and third devices to the radio network via the first, second, and third radio channels respectively, and when the quality of the first, second, and third radio channels is degraded.

6. The method according to claim 5, further comprising determining that the third condition is met when the first distance is less than a first threshold and the second distance is less than the first threshold or less than a second threshold.

7. The method according to claim 1, further comprising providing an input that comprises
    an indicator of the quality of the first radio channel, an indicator of the quality of the second radio channel, and an indicator of the quality of the third radio channel,
    the first position, the second position, and the third position,
    an indicator of which access point, between the first access point and the second access point, connects the first device to the radio network,
    an indicator of which access point, between the first access point and the second access point, connects the second device to the radio network, and
    an indicator of which access point, between the first access point and the second access point, connects the third device to the radio network; and
    providing a classification of the input as degraded due to interference, or degraded due to an object blocking a line of sight, or not degraded; and
    training a classificator with a training data point that maps the input to the classification of the input.

8. The method according to claim 7, wherein detecting the cause of a degradation of the quality further comprises detecting interference or an object blocking line of sight depending on an output of the so trained classifier in response to the input comprising the first position, the second position, the third position, the quality of the first radio channel, the quality of the second radio channel, and the quality of the third radio channel.

9. The method according to claim 1, further comprising providing an input that comprises
    an indicator of the quality of the first radio channel, an indicator of the quality of the second radio channel, and an indicator of the quality of the third radio channel,
    the first distance between the first position and the third position and the second distance between the second position and the third position,
    an indicator of which access point, between the first access point and the second access point, connects the first device to the radio network,
    an indicator of which access point, between the first access point and the second access point, connects the second device to the radio network, and
    an indicator of an access point, between the first access point and the second access point, connects the third device to the radio network; and
    providing a classification of the input as degraded due to interference, or degraded due to an object blocking a line of sight, or not degraded,
    training a classificator with a training data point that maps the input to the classification of the input.

10. The method according to claim 9, wherein detecting the cause of a degradation of the quality further comprises detecting interference or an object blocking line of sight depending on an output of the so trained classificator in response to the input comprising the first distance, the second distance, the quality of the first radio channel, the quality of the second radio channel, and the quality of the third radio channel.

11. The method according to claim 1, further comprising assigning the first device and the second device to another access point when an object is detected.

12. The method according to claim 1, further comprising assigning the first device and the second device and the third device to another channel than the first channel and than the second channel and than the third channel when an interference is detected.

13. The method according to claim 1, further comprising
determining the quality of a first radio link depending on a measurement of a signal strength or packet loss in a communication over the first radio link,
determining the quality of a second radio link depending on a measurement of a signal strength or packet loss in a communication over the second radio link, and/or
determining the quality of a third radio link depending on a measurement of a signal strength or packet loss in a communication over the third radio link.

14. A network controller for operating a radio network, the network controller comprising:
an electronic processer configured to:
detect a quality of a first radio channel that connects a first device to the radio network,
detect a quality of a second radio channel that connects a second device to the radio network,
detect a quality of a third radio channel that connects a third device to the radio network,
detect which access point of a plurality of access points of the radio network provides access to the radio network for the first device, the second device and the third device,
detect a cause of a degradation of the quality of at least one of the radio channels based at least in part on the quality of the first radio channel, the quality of the second radio channel, and the quality of the third radio channel and depending on which respective access point of the radio network provides access to the radio network for the first device, the second device and the third device respectively,
detect a first position of the first device, detect a second position of the second device, detect a third position of the third device,
determine a first distance between the first device and the third device and a second distance between the second device and the third device, and
determine that a condition is met when the first distance is larger than a first threshold and the second distance is larger than the first threshold or larger than a second threshold,
wherein the cause is determined to be interference when the condition is met and when a same access point connects the first, second, and third devices to the radio network via the first, second, and third radio channels respectively.

15. A non-transitory, computer-readable medium containing instructions that when executed on a computer cause the computer to
detect a quality of a first radio channel that connects a first device to the radio network,
detect a quality of a second radio channel that connects a second device to the radio network,
detect a quality of a third radio channel that connects a third device to the radio network,
detect which access point of a plurality of access points of the radio network provides access to the radio network for the first device, the second device and the third device,
detect a cause of a degradation of the quality of at least one of the radio channels based at least in part on the quality of the first radio channel, the quality of the second radio channel and the quality of the third radio channel and depending on which respective access point of the radio network provides access to the radio network for the first device, the second device and the third device respectively;
detect a first position of the first device, detecting a second position of the second device, detecting a third position of the third device,
determine a first distance between the first device and the third device and a second distance between the second device and the third device, and
determine that a condition is met, when the first distance is larger than a first threshold and the second distance is larger than the first threshold or larger than a second threshold,
wherein the cause is determined to be interference when the condition is met and when a same access point connects the first, second, and third devices to the radio network via the first, second, and third radio channels respectively.

* * * * *